(12) United States Patent
Quantz et al.

(10) Patent No.: US 6,766,732 B1
(45) Date of Patent: Jul. 27, 2004

(54) CRACKING DIE ASSEMBLY FOR HIGH PRODUCTION NUTCRACKING APPARATUS

(75) Inventors: James B. Quantz, Lexington, SC (US); Pascal W. Pitts, Cayce, SC (US); John L. Feaster, Columbia, SC (US)

(73) Assignee: Machine Design Incorporated, West Columbia, SC (US)

( * ) Notice: Subject to any disclaimer, the term of this patent is extended or adjusted under 35 U.S.C. 154(b) by 0 days.

(21) Appl. No.: 10/659,417

(22) Filed: Sep. 10, 2003

(51) Int. Cl.[7] .................................................. A23N 5/00
(52) U.S. Cl. ............................ 99/571; 99/574; 99/581
(58) Field of Search ........................... 99/568, 571–576, 99/577–579, 580–583, 600, 601; 426/481, 482, 480; 30/120.1–120.5; 198/622

(56) References Cited

U.S. PATENT DOCUMENTS

| | | | | |
|---|---|---|---|---|
| 3,871,275 A | * | 3/1975 | Quantz | 99/571 |
| 4,332,827 A | * | 6/1982 | Quantz | 426/481 |
| 4,418,617 A | * | 12/1983 | Quantz | 99/571 |
| 4,441,414 A | * | 4/1984 | Quantz | 99/571 |
| 5,623,867 A | * | 4/1997 | Quantz | 99/571 |
| 6,182,562 B1 | * | 2/2001 | Quantz et al. | 99/571 |
| 6,205,915 B1 | * | 3/2001 | Quantz | 99/571 |
| 6,270,824 B1 | * | 8/2001 | Quantz | 426/482 |
| 6,584,890 B1 | * | 7/2003 | Quantz et al. | 99/571 |

* cited by examiner

Primary Examiner—Timothy F. Simone
(74) Attorney, Agent, or Firm—Alston & Bird LLP

(57) ABSTRACT

A cracking die assembly which is adapted for use in a high production nutcracking apparatus of the type wherein a nut is held between an anvil and a cracking die, and a shuttle then impacts against the rearward end face of the cracking die to sharply advance the cracking die and thereby crack the shell of the nut. The cracking die assembly includes a mounting sleeve having a bore with an internal shoulder, and a tubular retainer mounted within a portion of the sleeve bore so as to engage the shoulder of the sleeve. An annular gasket is fixedly mounted in the bore of the retainer, and the cracking die has a radial flange which is positioned to lie between the shoulder in the bore of the sleeve, and the gasket. Also, the gasket and radial flange have conforming surfaces which engage when the cracking die is impacted by the shuttle, and the gasket is free to radially expand to absorb a portion of the impacting force of the shuttle.

13 Claims, 2 Drawing Sheets

CRACKING DIE ASSEMBLY FOR HIGH PRODUCTION NUTCRACKING APPARATUS

BACKGROUND OF THE INVENTION

The present invention generally relates to an improved cracking die assembly for use in a high production nutcracking apparatus.

In prior U.S. Pat. No. 3,871,275, there is disclosed a high production nutcracking apparatus wherein a plurality of cracking units are arranged on a rotatable turret, with each cracking unit having an opening adapted to receive an individual nut which is dropped from a feed conveyor as the cracking unit moves through its top center position. Each cracking unit includes an anvil mounted on one side of the opening, and a cracking die mounted for limited movement on the other side of the opening and so that the anvil and cracking die are adapted to receive and hold the nut therebetween. A free floating shuttle is mounted rearwardly of the die, and the shuttle is thrust forwardly into impacting engagement with the rearward side of the cracking die after the nut is received in the opening, and so that the shell of the retained nut will be cracked by the resulting forward movement of the die.

Prior U.S. Pat. Nos. 4,332,827 and 5,623,867, disclose improved high production nutcracking apparatus, which includes an improved nut feeding conveyor by which the nuts are singularized and oriented prior to being delivered to the individual cracking units.

Prior U.S. Pat. Nos. 4,441,414 and 6,182,562 disclose a cracking die assembly for a high speed nutcracking apparatus of the type disclosed in the above patents and which comprises a retainer mounted within the bore of a mounting sleeve. The cracking die has a radial flange mounted to oppose a shoulder in the bore of the retainer so as to permit limited movement in the axial direction, and an annular resilient gasket is disposed between the flange of the die and the retainer shoulder and so as to absorb at least a portion of the impacting force from the shuttle.

During high speed operation, the annular gaskets are subjected to repeated impacts and to heat generated from the friction resulting from the relative axial movement between the gasket and the retainer, and between the gasket and the die. As a result, the gasket rapidly deteriorates in use, requiring repeated disassembly of the cracking die assembly.

It is accordingly an object of the present invention to provide a cracking die assembly adapted for use in a high speed nutcracking apparatus of the described type, and which minimizes the deterioration of the gasket in use, to thereby minimize the frequency of the replacement of the gasket.

SUMMARY OF THE INVENTION

The above and other objects and advantages of the present invention are achieved by the provision of a cracking die assembly which comprises a tubular retainer having an internal bore which includes a forwardly facing shoulder and a rearwardly facing shoulder, so that the two shoulders face each other in a spaced apart arrangement which defines a cylindrical cavity therebetween having a predetermined diameter. An annular gasket is mounted within the cylindrical cavity, and the gasket has an axial dimension which is approximately the same as the distance between the shoulders so as to be retained therebetween. The gasket has an outer diameter which is less than the predetermined diameter of the cylindrical cavity so as to define a space therebetween, which allows the gasket to radially expand upon being impacted by the crack die during operation of the cracking apparatus.

Thus with the present invention, the gasket absorbs and dissipates at least a portion of the energy imparted by the impact of the shuttle, through a radial expansion of the gasket, rather than by an internal compression of the gasket. The repeated internal compression of the gasket as occurs with the prior art designs is believed to contribute to the heating and thus the deterioration of the gasket, and such effects can be minimized with the present invention.

In one embodiment of the invention, the opposing surfaces of the gasket and cracking die are generally perpendicular to a central axis defined by the retainer. In another embodiment, the opposing surfaced comprise mating conical surfaces which are inclined at an angle of inclination of between about 30° C. and 60°.

Since the annular gasket is of substantially the same axial extent as the distance between the opposing shoulders of the retainer, it is essentially locked against axial movement in the retainer, so as to eliminate the heat generated by the friction associated with its axial movement. Also, the gasket includes a flexible sealing lip which engages the die so as to further reduce friction and also prevent the inflow of air and debris into the interior of the retainer.

BRIEF DESCRIPTION OF THE DRAWINGS

Some of the objects of the invention having been stated, other objects and advantages will appear as the description proceeds, when taken in connection with the accompanying drawings, in which.

DETAILED DESCRIPTION OF THE INVENTION

Figure 1:
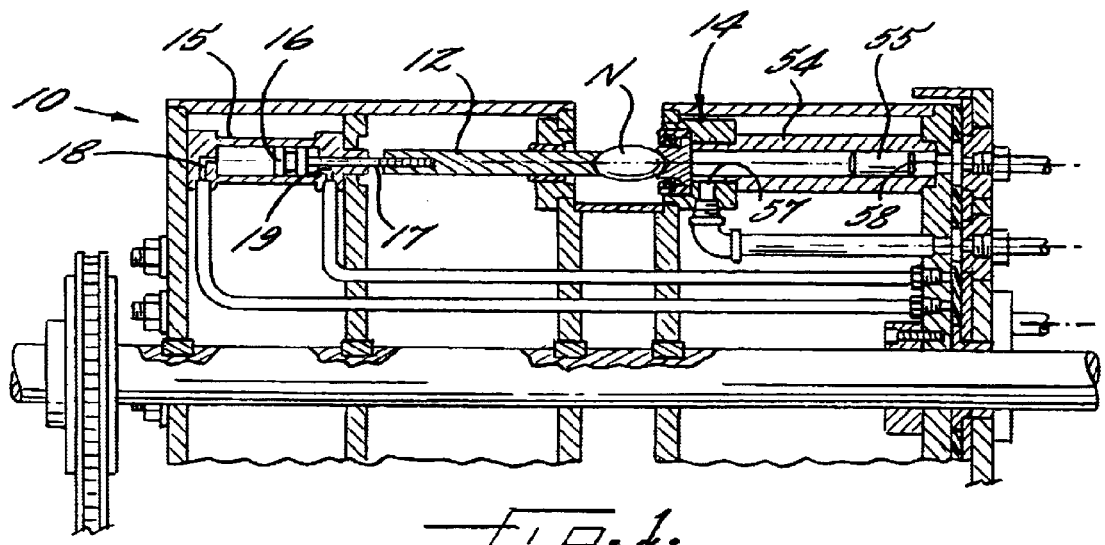
FIG. 1 is a fragmentary sectional side elevation view of a nutcracking apparatus which embodies the features of the present invention.

Referring more particularly to the drawings, there is illustrated in FIG. 1 a cracking unit 10 of a high production nutcracking apparatus which embodies the features of the present invention. While a single unit 10 is illustrated, it will be understood that in a preferred embodiment, several such units are mounted on a rotatable turret as disclosed in applicant's prior U.S. Pat. Nos. 3,871,275; 4,332,827; and 5,623,867, the disclosures of which are expressly incorporated herein by reference.

The cracking unit 10 comprises an anvil 12, a cracking die assembly 14, and means mounting the anvil and cracking die assembly in an axially aligned, opposed relationship to define an opening for receiving a nut N therebetween. More particularly, the means for mounting the anvil 12 includes a first air cylinder 15, a piston 16 slideably disposed within the cylinder, a piston rod 17 interconnecting the piston and anvil, a first air port 18 disposed adjacent the rearward end of the cylinder 15, and a second air port 19 disposed adjacent the forward end of the cylinder. As will be apparent, movement of the piston 16 results in a corresponding movement of the anvil 12, either forwardly toward the cracking die assembly 14 or rearwardly therefrom. Such movement is controlled by air which is selectively provided to the first and second ports in a manner more fully disclosed below, and as further described in applicant's above note prior patents.

Figure 4:
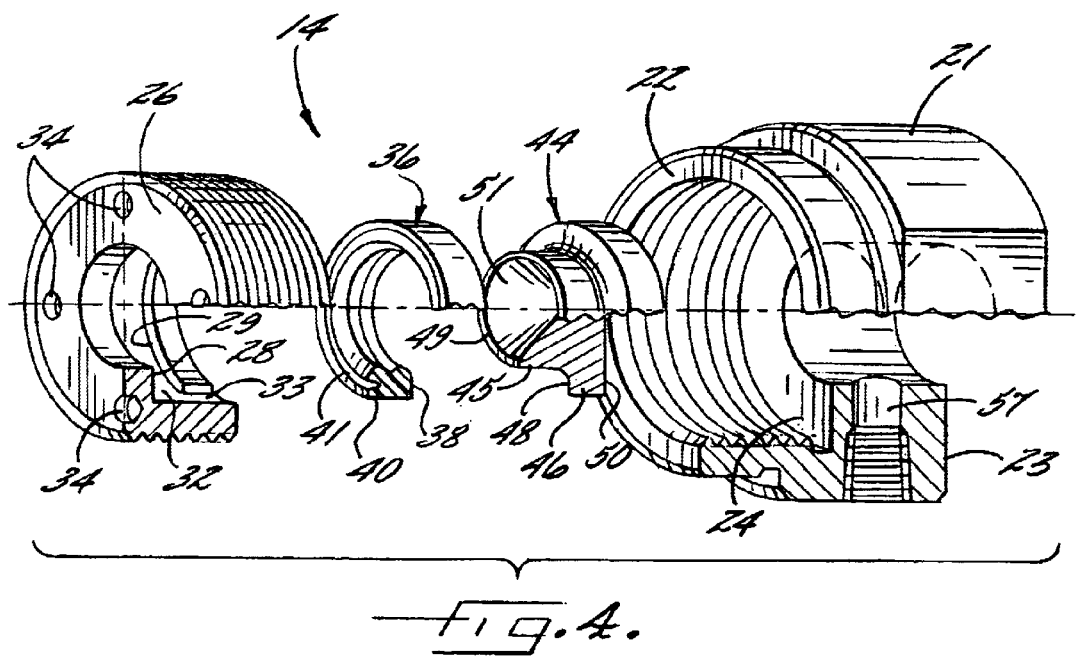
FIG. 4 is an exploded perspective view of the cracking die assembly.

The cracking die assembly 14 includes mounting sleeve 21 defining a forward end 22 and a rearward end 23, and which has a stepped internal cylindrical bore which includes a forwardly facing radial shoulder 24 (FIG. 4) intermediate the ends.

Figure 3:
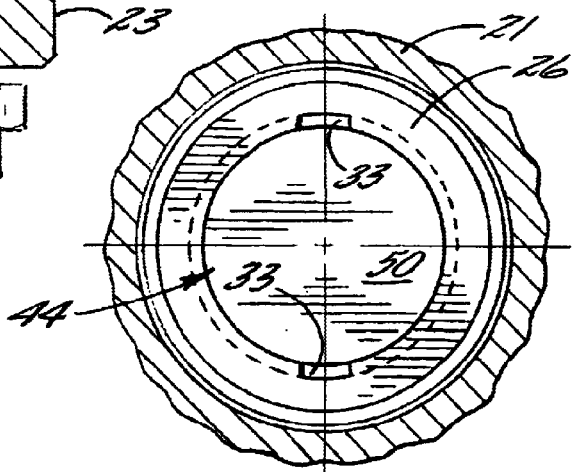
FIG. 3 is a sectional view taken along the line 33 of FIG. 2.

A tubular retainer 26 is coaxially mounted in the forward end portion of the sleeve bore, and the retainer 26 includes a stepped internal cylindrical bore which is coaxial with the bore of the sleeve 21 and which includes a rearwardly facing shoulder 28 and a forwardly facing shoulder 29. The shoulders 28 and 29 thus face each other in a spaced apart arrangement and define a cylindrical cavity 32 therebetween. Also, the rearward portion of the bore of the retainer is cylindrical and includes a pair of slots 33 (FIG. 3) for the purpose explained below.

The retainer 26 is removably mounted in the sleeve bore by means of cooperating threads, and so that its inner end engages the shoulder 24 of the sleeve. A plurality of indentations 34 are provided in the forward end face of the retainer to permit the retainer to be mechanically gripped by a suitable spanner wrench for rotation relative to the sleeve and removal therefrom to facilitate periodic cleaning or repair.

An annular gasket 36 is mounted within the cylindrical cavity 32 of the internal bore of the retainer 26, so as to be retained between and against the shoulders 28 and 29, and the annular gasket 36 has a rearwardly facing end face 38 which is spaced from the radial shoulder 24 of the sleeve 21. The gasket 36 has an outer diameter which is less than the internal diameter of the cylindrical cavity 32 so as to define an annular space therebetween.

In a preferred embodiment, the gasket 36 is composed of a high density plastic material, such as the urethane identified as Product No. P4300A90 by Dupont. Also in a preferred embodiment, the gasket 36 has an outer diameter of about 1.062 inches, and the cylindrical cavity 32 has an internal diameter of about 1.687 inches, so that the resulting annular space is about 0.312 inches between the outer periphery of the gasket and the wall of the cylindrical cavity. The annular gasket 36 also includes an integral sealing lip 40 which extends radially inwardly. To render the sealing lip more flexible for the purposes to become apparent, the front end face of the gasket includes an annular channel or notch 41.

A cracking die 44 is mounted coaxially within the retainer 26. The die 44 is preferably composed of a solid metallic material, such as an aluminum alloy, and it includes a cylindrical forward end portion 45 which is received within the bore of the gasket 36 and a radial flange 46 disposed within the rearward bore portion of the retainer adjacent the shoulder 24. The flange 46 has an axial dimension less than the distance between the sleeve shoulder 24 and the rearwardly facing end surface 38 of the gasket 36, so as to permit limited axial movement of the die. Also, the flange 46 of the die 44 includes a forwardly facing shoulder 48 which opposes the rearwardly facing end surface 38 of the gasket 36. In the embodiment illustrated in FIG. 2, the opposing faces of the gasket and the shoulder are both generally perpendicular to the central axis defined by the retainer.

The cylindrical forward end portion 45 of the die extends forwardly from the shoulder 48, through the gasket 36, and to a forward end face 49. The sealing lip 40 of the gasket engages the cylindrical portion 45 about its entire periphery so as to prevent the passage of foreign substances past the cracking die during its axial movement. The radial flange 46 of the die has an axial dimension less than the distance between the shoulder 24 and the end face 38 for permitting limited axial movement of the die.

The die 44 further includes a generally flat rearward end face 50 which is perpendicular to the central axis defined by the sleeve and retainer, and the forward end face 49 has an axial depression 51 formed therein which is adapted to receive a portion of a nut N to be cracked. The axial depression 51 is of conical cross sectional configuration.

Figure 5:
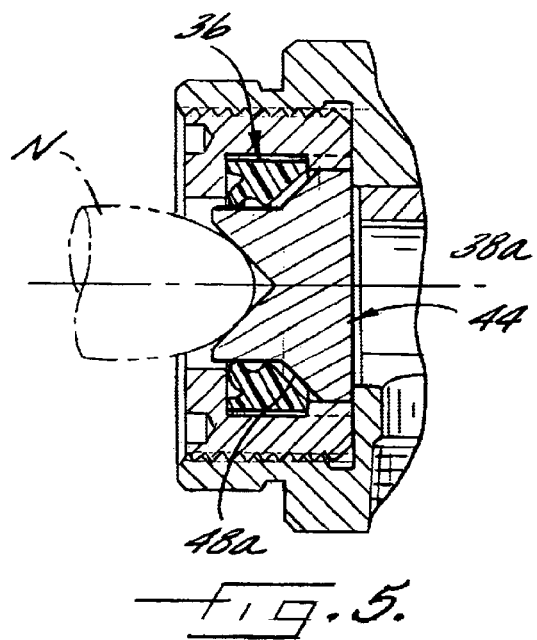
FIG. 5 is a view similar to FIG. 2 and showing a second embodiment of the cracking die assembly.

FIG. 5 illustrates a second embodiment of the cracking die assembly of the invention, and wherein the rearwardly facing end surface 38a of the gasket, and the forwardly facing surface of the shoulder 48a, are of a mating conical configuration. Preferably, the inclination of these mating surfaces is between about 30° and 60°, and most preferably is about 45°. In all other respects, the assembly as shown in FIG. 5 corresponds to that shown in FIGS. 1–4.

The cracking die assembly 14 further includes a second air cylinder 54 mounted coaxially at the rearward end of the sleeve 21, and a free floating shuttle 55 is mounted within the air cylinder 54. In addition, there is provided an air port 57 adjacent the forward end of the cylinder, and a further port 58 which extends axially through the rearward end of the cylinder.

Figure 2:
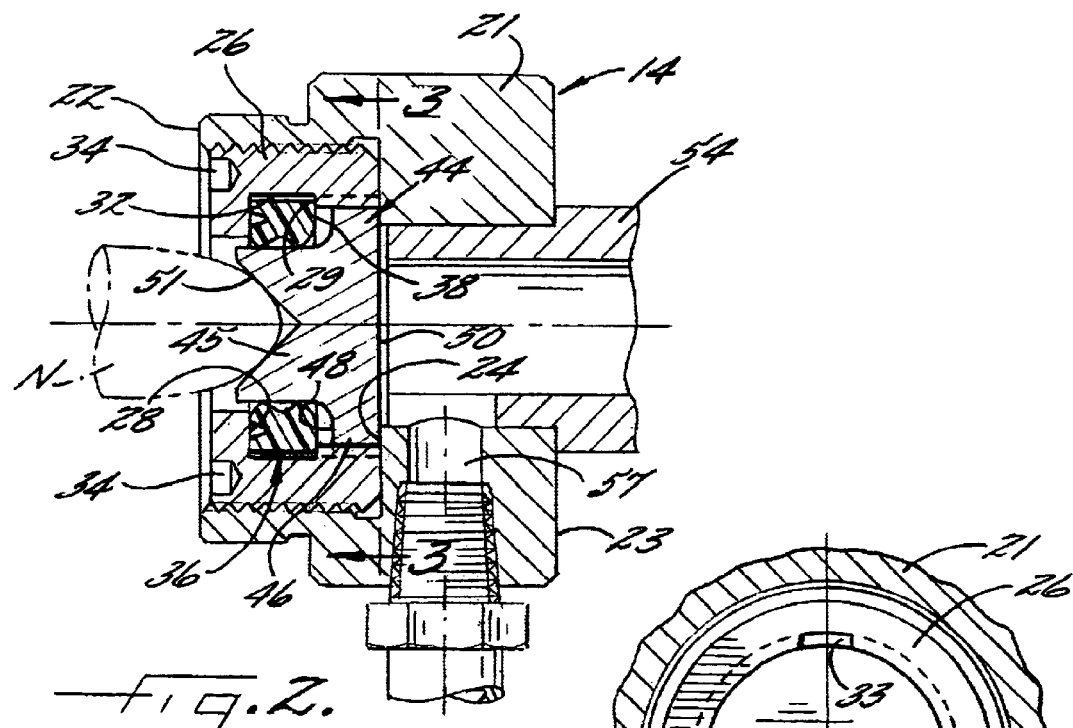
FIG. 2 is an enlarged sectional view of the cracking die assembly of the apparatus illustrated in FIG. 1.

The control system for cyclically actuating the cracking unit includes an air control system whereby air is selectively introduced into the four ports 18, 19, 57, and 58. More particularly, upon receiving a nut N in the opening between the anvil 12 and cracking die assembly 14, air is first introduced into the port 18 so that the piston 16 and anvil 12 are moved forwardly and such that the anvil 12 operatively engages one end of the nut N in the opening. The nut thereby becomes supported between the anvil 12 and die 44, and the force provided by the anvil acts through the nut to move the cracking die rearwardly so that the flange 46 contacts the shoulder 24, as seen in FIG. 2. The anvil 12 and cracking die 44 thereby also serve to compressively stress the retained nut.

High pressure air is next injected through the port 58 and into the air cylinder 54, such that the shuttle 55 is thrust forwardly along the cylinder and impacts against the rearward end face 50 of the cracking die, causing the cracking die to sharply advance a short distance forwardly against the nut and thereby crack its shell. The slots 33 permit the passage of air around the flange during axial movement of the die. The slots thus facilitate this axial movement by eliminating closed air pockets, and they also prevent the inflow of air and debris into the interior of the retainer.

In the absence of a nut in the opening, the gasket 36 will absorb the entire impacting force, and even during normal cracking it is believed the gasket may absorb at least a significant portion of the impacting force. The air in front of the advancing shuttle is permitted to exhaust through the port 57. Air next enters the port 19, causing the piston 16 and anvil 12 to move rearwardly and release the nut, and as a final step, air is caused to enter the port 57 and thereby return the shuttle 55 to its rearward position. The apparatus is then in position to receive another nut to be cracked, with the above cycle being cyclically repeated. Further details regarding the air control system for cyclically actuating the unit 10 may be obtained from applicant's above noted prior patents.

In the drawings and specification, there has been set forth a preferred embodiment of the invention, and although specific terms are employed, they are used in a generic and descriptive sense only and not for purposes of limitation.

What is claimed is:

1. A cracking die assembly adapted for use in a high production nutcracking apparatus comprising a tubular retainer including an internal bore which includes a rearwardly facing shoulder and a forwardly facing shoulder so that the forwardly facing shoulder opposes said rearwardly facing shoulder in a spaced apart arrangement which defines a cylindrical cavity therebetween having a predetermined diameter, and an annular gasket mounted within the cylindrical cavity, said gasket having an axial dimension which is approximately the same as the distance between said shoulders so as to be retained therebetween, and said gasket having an outer diameter which is less than the predetermined diameter of said cylindrical cavity so as to define a space therebetween which allows the gasket to radially expand upon being impacted in the axial direction.

2. The cracking die assembly of claim 1 wherein said retainer includes a forward end face and a rearward end face and so that the portion of said internal bore of said retainer extending between said forwardly facing shoulder and said rearward end face defines a generally cylindrical rearward bore portion of a predetermined axial length, and wherein said gasket has a rearwardly facing end surface which extends radially inwardly with respect to said rearward bore portion.

3. The cracking die assembly of claim 2 further comprising a cracking die disposed coaxially within said internal bore of said retainer and including a radial flange disposed within said rearward bore portion and having an axial dimension less than that of said rearward bore portion, with said radial flange defining a forwardly facing shoulder which opposes and is adapted to engage said rearwardly facing end surface of said gasket.

4. The cracking die assembly of claim 3 wherein said rearwardly facing end surface of said gasket and said forwardly facing shoulder of said die include opposed portions which are generally perpendicular to a central axis defined by the retainer.

5. The cracking die assembly of claim 3 wherein said rearwardly facing end surface of said gasket and said forwardly facing shoulder of said die include opposed conical portions which are inclined at an angle of inclination of between about 30° and 60° with respect to a central axis defined by the retainer.

6. The cracking die assembly of claim 3 wherein said cracking die includes a cylindrical portion which extends forwardly from said forwardly facing shoulder and through said annular gasket, and wherein said gasket includes an annular sealing lip which engages said cylindrical portion of said die.

7. The cracking die assembly of claim 6 wherein said cylindrical portion of said cracking die includes a forward end face which is configured to engage the end of a nut to be cracked, and an opposite rearward end face, whereby said cracking die is adapted to be impacted on said rearward end face and be sharply thrust forward a limited distance so as to impart a cracking force to a nut engaged by said forward end face of said die, and with the shoulder of the cracking die engaging the rearwardly facing end face of said gasket so that the annular gasket expands radially into said space and absorbs at least a portion of the impacting force.

8. The cracking die assembly of claim 7 further comprising a mounting sleeve having an internal bore which includes a forwardly facing shoulder intermediate its ends, and wherein said tubular retainer is mounted within said bore with the rearward end face of the retainer in engagement with said forwardly facing shoulder of said mounting sleeve.

9. The cracking die assembly of claim 8 wherein said retainer is removeably mounted in said sleeve bore by means of cooperating threads, and wherein said forward end face of said cracking die includes a concave depression for receiving an end portion of a nut to be cracked.

10. The cracking die assembly of claim 1 wherein said annular gasket consists essentially of urethane plastic.

11. In a nutcracking apparatus comprising a cracking die having a forward end face and a rearward end face, an anvil mounted opposite said forward end face of said die to define an opening therebetween which is adapted to receive a nut, means mounting said cracking die for limited movement toward and away from said opening, means mounting said anvil for limited movement toward and away from said opening and for biasing said anvil in a direction toward said opening so that a nut may be retained between said anvil and said cracking die, a free floating shuttle mounted rearwardly of said cracking die, and means for periodically sharply thrusting said shuttle forwardly into impacting engagement with said rearward end face of said cracking die such that a nut retained between said anvil and said cracking die will be cracked by the resulting forward movement of the cracking die, the improvement wherein said cracking die is included in a cracking die assembly which comprises a mounting sleeve having an internal bore which defines a central axis and which includes a forwardly facing radial shoulder intermediate its ends, a tubular retainer mounted within said bore of said sleeve forwardly of said shoulder, with said retainer including an internal bore which includes a rearwardly facing shoulder and a forwardly facing shoulder so that the forwardly facing shoulder opposes said rearwardly facing shoulder in a spaced apart arrangement which defines a cylindrical cavity therebetween having a predetermined diameter, an annular gasket mounted within the cylindrical cavity, said gasket having an axial dimension which is approximately the same as the distance between said shoulders of said retainer so as to be retained therebetween, said gasket having a rearwardly facing end surface which extends radially into the internal bore of said retainer, and said gasket further having an outer diameter which is less than the predetermined diameter of said cylindrical cavity so as to define a space therebetween which allows the gasket to radially expand upon being impacted in the axial direction, said cracking die being disposed coaxially within said internal bore of said retainer and including a radial flange disposed between said sleeve shoulder and said rearwardly facing end surface of said gasket, with said flange having an axial dimension less than the distance between said sleeve shoulder and said rearwardly facing end surface of said gasket for permitting limited axial movement of said die, and with said flange of said die defining a forwardly facing shoulder which opposes and is adapted to engage the rearwardly facing end surface of said gasket.

12. The cracking die assembly of claim 11 wherein said rearwardly facing end surface of said gasket and said forwardly facing shoulder of said die include opposed portions which are generally perpendicular to the central axis defined by the retainer.

13. The cracking die assembly of claim 11 wherein said rearwardly facing end surface of said gasket and said forwardly facing shoulder of said die include opposed conical portions which are inclined at an angle of inclination of between about 30° and 60° with respect to the central axis defined by the retainer.

* * * * *